United States Patent [19]

Hayakawa

[11] 3,922,629
[45] Nov. 25, 1975

[54] OBJECT DETECTION SYSTEM HAVING FAULT DETECTION FUNCTION

[75] Inventor: Michitaro Hayakawa, Chofu, Japan

[73] Assignee: Kabushiki Kaisha Seidensha, Japan

[22] Filed: Mar. 20, 1974

[21] Appl. No.: 453,084

[30] Foreign Application Priority Data
Mar. 24, 1973  Japan.............................. 48-33971

[52] U.S. Cl..................... 340/1 R; 340/5 C; 340/32
[51] Int. Cl.² ........................................ G01S 9/66
[58] Field of Search ............. 340/1 R, 1 T, 3 R, 32, 340/38 S, 5 C

[56] References Cited
UNITED STATES PATENTS
3,360,775  12/1967  Schroeder........................ 340/32
3,781,772  12/1973  Inoue et al........................ 340/1 R

*Primary Examiner*—Richard A. Farley
*Attorney, Agent, or Firm*—Robert E. Burns; Emmanuel J. Lobato; Bruce L. Adams

[57] ABSTRACT

An object detection system using ultrasonic wave pulses, in which ultrasonic wave pulses are repeatedly generated from a sending transducer at desired intervals so that an object is detected by detecting, at the output of a receiving transducer, ultrasonic wave pulses reflected from the object by the use of receiving gate pulses synchronized with said desired intervals. In accordance with this invention, the timing slot of the receiving gate pulses is advanced at at least start instant thereof by a wobbler so that ultrasonic wave pulses directly propagated from the sending transducer to the receiving transducer is effectively detected to indicate in a fail-safe manner whether or not the object detection system is normal without substantial fault. The advance shift of the receiving gate pulses is manually or automatically performed.

6 Claims, 5 Drawing Figures

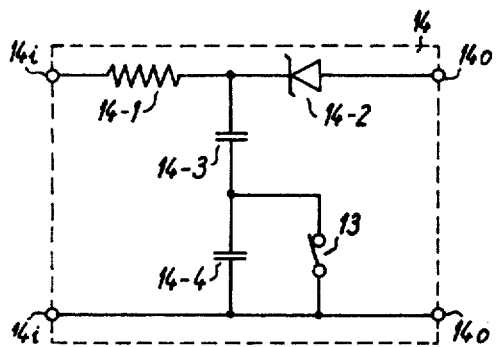 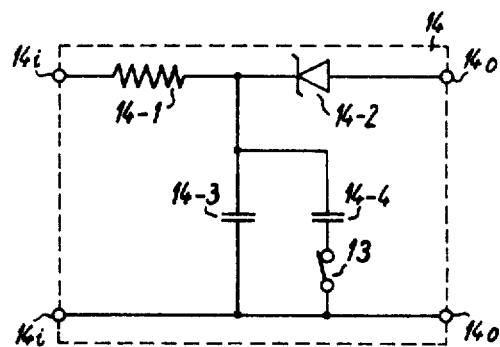
Fig. 3A    Fig. 3B
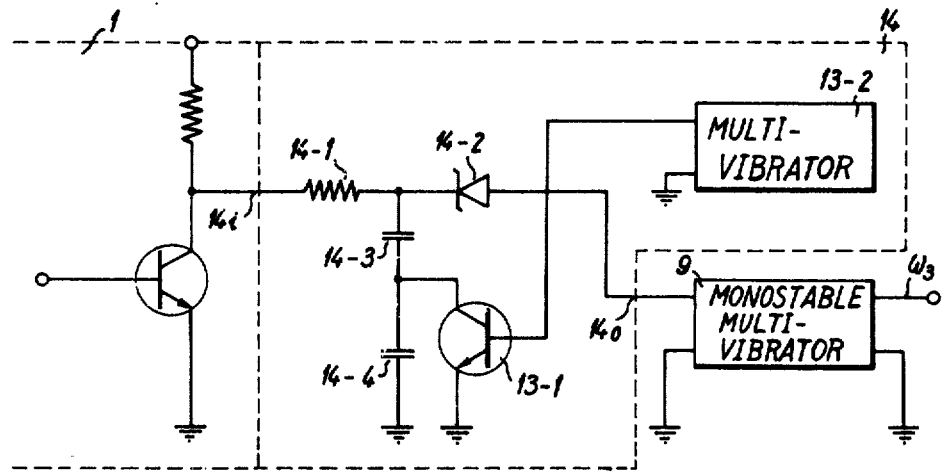
Fig. 4

OBJECT DETECTION SYSTEM HAVING FAULT DETECTION FUNCTION

This invention relates to an object detection system using an ultrasonic wave and, more particularly, to an object detection system of a vehicle for preventing unexpected accidents at the back of the vehicle.

In a conventional object detection system of the type, ultrasonic wave pulses are repeatedly generated from a sending transducer provided on a vehicle. If an object exists in the path of the ultrasonic wave near the vehicle, reflected wave pulses are received by a receiving transducer on the same vehicle and detected so that an alarm is actuated to prevent an unexpected accident at the back of the vehicle. These object detection systems are generally useful to reduce the chance of accidents at the back of the vehicle. Accordingly, if such an object detection system is provided on a vehicle, the driver of the vehicle will probably believe in and depend on the reliability of the object detection system. However, since no alarm is actuated for a close object in case of a fault in the object detection system, the probability of occurrences of unexpected accidents may increase in the opposite way for vehicles having such object detection system.

An object of this invention is to provide an object detection system using an ultrasonic wave which has a fault detection function of fail-safe type.

In accordance with the principle of this invention, a gate timing slot for detecting the output of a receiving transducer is manually or automatically shifted at at least start instant of the gate timing slot at a desired time or at desired intervals, so that an ultrasonic wave pulse directly transmitted from a sending transducer to the receiving transducer is effectively detected by a receiving gate controlled by the gate timing slot to indicate in a fail-safe manner whether or not the object detection system is normal without any fault.

The principle, construction and operations of this invention will be clearly understood from the following detailed description taken in conjunction with the accompanying drawings, in which:

FIGS. 3A and 3B are circuit diagrams each illustrating an example of a manual wobbler employed in this invention; and FIG. 4 is a circuit diagram illustrating an automatic wobbler employed in this invention.

Figure 1:
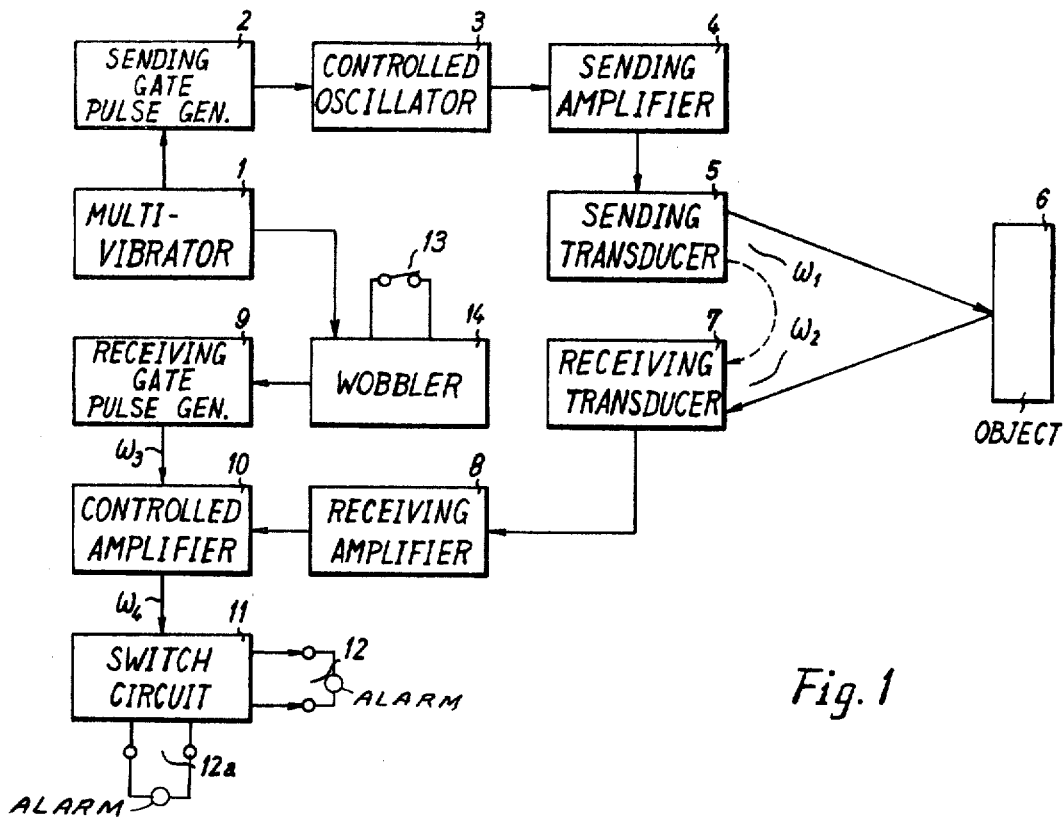
FIG. 1 is a block diagram illustrating an embodiment of this invention.
Figure 2:
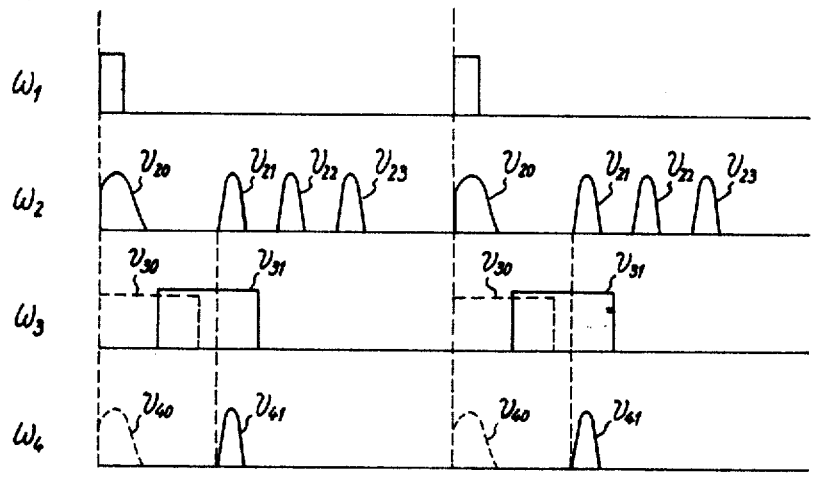
FIG. 2 is time charts explanatory of operations of the system of this invention.

With reference to FIGS. 1 and 2, an embodiment of this invention will be described. A multivibrator 1 is a free-running multivibrator, which has a desired repetition frequency (e.g. 10Hz). The output of the multivibrator 1 is applied to a sending gate pulse generator 2, such as a monostable multivibrator, which generates pulses of small duration (e.g. 2 milli-seconds) in synchronism with the repetition frequency of the output of the multivibrator 1. The gate pulses from the sending gate pulse generator 2 are applied to a controlled oscillator 3, so that oscillation wave pulses suitable for generating an ultrasonic wave are applied to a sending electro-ultrasonic transducer 5 through a sending amplifier 4 in synchronism with the sending gate pulses from the sending gate pulse generator 2. Ultrasonic wave pulses $w_1$ are sent out from the sending transducer 5 as shown in FIG. 2 in synchronism with the sending gate pulses and also the oscillation wave pulses. The ultrasonic wave pulses $w_1$ are reflected by an object 6 and received by a receiving ultrasonic-electric transducer 7, so that the received ultrasonic wave pulses $w_2$ are converted to electric wave pulses by the receiving transducer 7. The converted electric wave pulses are applied from the receiving transducer 7 to a controlled amplifier 10 through a receiving amplifier 8. On the other hand, the output of the multivibrator 1 is also applied to a wobbler circuit 14 which is operable to delay the multi-vibrator output and apply it to the receiving gate pulse generator 9, such as a monostable multivibrator, which generates receiving gate pulses $w_3$ of appropriate duration in synchronism with the repetition frequency of the output of the multivibrator 1. The receiving gate pulses $w_3$ from the receiving gate pulse generator 9 are applied to the controlled amplifier 10, so that the gain of the controlled amplifier 10 is caused to be effective during the duration of the receiving gate pulses $w_3$. THe gain of the controlled amplifier 10 is maintained substantially zero, by a bias voltage by way of example, when the receiving gate pulses $w_3$ are not applied. Accordingly, the output pulses $w_4$ are obtained from the controlled amplifier 10 in response to the receiving gate pulses $w_3$ in a case where the object 6 exists in the path of the ultrasonic wave pulses $w_1$ within an available range of this detection system. The detected pulses $w_4$ are applied to a switch circuit 11 to obtain an alarm signal across terminals 12 which is connected to an alarm.

In accordance with the principle of this invention, the time slots or times of occurrence of the receiving gate pulses $w_3$ are advanced by a wobbler 14 as mentioned below in response to control of a control switch 13 by way of example. Accordingly, ultrasonic wave pulses directly propagated from the sending transducer 5 to the receiving transducer 7 are detected by the receiving transducer 7, the receiving amplifier 8 and the controlled amplifier 10 in response to control of the wobbler 14 as understood from the time chart shown in FIG. 2.

An example of the wobbler 14 is shown in FIg. 3A, in which the output of the multivibrator 1 is applied across input terminals $14_i - 14_i$ and delayed by an integrator formed by a resistor 14-1 and capacitors 14-3 and 14-4. The output of the integrator is obtained across output terminals $14_o - 14_o$ through a zenor diode 14-2 and then applied to the receiving gate pulse generator 9, such as a monostable multivibrator. A switch 13 is a non-lock switch, which is manually controlled to test the normal operable condition of this object detection system before an actual usage. In response to the control of the switch 13, the capacitor 14-4 is effectively connected in series to the capacitor 14-3 so that the capacitance of the integrator is reduced in response to the control of the switch 13. Accordingly, the time slots of the receiving gate pulses $w_3$ can be advanced as shown by pulses $v_{30}$ from pulses $v_{31}$ in FIG. 2 in response to the control of the control switch 13. If it is assumed that one ($v_{21}$) of the reflected ultrasonic wave pulses $v_{21}$, $v_{22}$ and $v_{23}$ are detected by the use of the normal receiving gate pulses $v_{31}$ as shown by waves $v_{41}$, the directly propagated ultrasonic wave $v_{20}$ can be detected by the use of the advanced gate pulses $v_{30}$ as shown by waves $v_{40}$.

The example shown in FIG. 3A may be modified as shown in FIG. 3B, in which the capacitor 14-4 is connected in parallel with the capacitor 14-3 through the control switch 13. The operation of this example is substantially the same as the example shown in FIG. 3A. However, the parallel capacitance of the capacitors 14-3 and 14-4 is substantially equal to the capacitance of the capacitor 14-3 in FIG. 3A.

The control switch 13 employed in the example shown in FIG. 3A or 3B can be replaced by an electrical switch as shown in FIG. 4, in which the switch 13 comprises a transistor 13-1 and an astable multivibrator 13-2 of a very low repetition frequency, such as one Herz. Accordingly, the operable test can be automatically performed in synchronism with the repetiton frequency of the astable multivibrator 13-2. This example is formed in view of the example shown in FIG. 3A, but this modification can be also applied to the example shown in FIG. 3B as mentioned above. In this example, the transistor 13-1 becomes conductive when the output state of the astable multivibrator 13-2 assumes a positive voltage at the base of the transistor 13-1 with respect to the ground potential. Other operations are substantially the same as the operations of examples shown in FIGS. 3A and 3B.

As understood from the above description, the detection system is normal with no fault if the directly propagated ultrasonic wave pulses are periodically detected at the output of the controlled amplifier 10 when the control switch 13 is controlled in the examples described with reference to FIGS. 1, 2, 3A and 3B. In the example described with reference to FIG. 4, the directly propagated ultrasonic wave pulses are periodically detected without any control of such control switch if the detection system is normal with no fault. In these cases, if the directly propagated ultrasonic wave pulses are not periodically detected, the operator of this detection system can understand at once that the detection system is in fault. Moreover, this indication of fault is a fail-safe manner since no indication is decided as fault.

The output of the switch circuit 11 is applied to an alarm, such as a lamp or a buzzer. The directly propagated ultrasonic wave pulses can be distinguished from the reflected ultrasonic wave pulses since the directly propagated ultrasonic wave pulses are detected within the controlled time of the control switch 13. In the example shown in FIG. 4, if the repetition frequency of the asable multivibrator 13-2 is sufficiently lower than that of the multivibrator 1, the above two kinds of ultrasonic wave pulses can be effectively distinguished even if only one alarm is employed at the output of the switch 11. However, two alarms may be employed for the directly propagated ultrasonic wave pulses and the reflected ultrasonic wave pulses to clearly distinguish from each other. In the examples described with reference to FIGS. 1, 3A and 3B, the switching of the output of the switch circuit 11 can be performed by the switch circuit 11 by way of example, which is simultaneously controlled with the switch 13 to connect other output terminals 12a to the other alarm. In the example described with reference to FIG. 4, the switching of the output of the switch circuit 11 can be performed by the switch circuit 11 by way of example, which is simultaneously controlled with the transistor 13-1 by the use of the output of the astable multivibrator 13-2.

In the above examples, the time slots of the receiving gate pulses are advanced by the wobbler 14. However, it is not essential to advance the termination instant of each of the receiving gate pulses while the start instant of each of the receiving gate pulses must be advanced by the wobbler 14. In a case of nonadvance of the termination instant of each of the receiving gate pulses, the reflected ultrasonic wave pulses are detected together with the directly propagated ultrasonic wave pulses in response to the advanced shift of the start instants of the receiving gate pulses. However, this is allowable to carry out "fault-test" in accordance with this invention.

As mentioned above, since substantial faults of circuit elements of the object detection system can be effectively detected in accordance with this invention in a fail-safe manner, this invention is useful to realize object detection systems having very high reliability. Accordingly, this invention is suitable for a back alarm employed at a vehicle, etc.

What I claim is:

1. An object detection system using ultrasonic wave pulses, comprising:
   pulse generation means for generating pulses at desired intervals;
   sending gate pulse means connected to said pulse generation means for generating sending gate pulses of short duration in synchronism with said pulses of desired intervals;
   controlled oscillator means connected to said sending gate pulse means for generating electric wave pulses;
   a sending transducer responsive to said electric wave pulses and electrically coupled to said controlled oscillator means for generating ultrasonic wave pulses in response to said electric wave pulses;
   a receiving transducer for receiving ones of said ultrasonic wave pulses reflected from an object to be detected;
   wobbler means connected to said pulse generating means for developing an output of controllably delayed pulses generated by said pulse generation means;
   receiving gate pulse means connected to said wobbler means for generating receiving gate pulses of appropriate duration in response to said delayed pulses of desired intervals to gate said reflected wave pulses;
   controlled amplifier means responsive to said receiving gate pulses and connected to said receiving gate pulse means and said receiving transducer for gating the output of said receiving transducer in response to said receiving gate pulses;
   switch means connected to said controlled amplifier means for obtaining at least one alarm signal in response to the output of said controlled amplifier means; and
   alarm means connected to said switch means for indicating at least one alarm in response to said alarm signal.

2. An object detection system according to claim 1, in which said wobbler means comprises an integrator for integrating the output of said pulse generation means, a manually controllable switch means connected to the integrator for reducing the time constant of the integrator, and a zener diode connected to said integrator for clipping the output of the integrator to obtain said receiving gate pulses.

3. An object detection system according to claim 1, in which said wobbler means comprises an integrator for integrating the output of said pulse generation means, an electronic switch means connected to the integrator for reducing the time constant of the integrator, an astable multivibrator connected to said electronic switch means for enabling said electronic switch at constant intervals sufficiently longer than said desired intervals, and a zener diode connected to said integrator for clipping the output of the integrator to obtain said receiving gate pulses.

4. In an ultrasonic object detection system of the type including a transmitter for transmitting ultrasonic pulses; and a receiver intermittently enabled at a rate at which the ultrasonic pulses are transmitted for receiving ones of the ultrasonic pulses reflected back to the receiver by an object and for indicating the reception of the received reflected pulses; the improvement which comprises:

enabling means operable for varying relative to the transmitted pulses the instants at which said receiver is enabled to enable said receiver to receive and indicate the reception of pulses directly from said transmitter, and thereby indicate that said receiver is functioning in the absence of received reflected pulses.

5. In an ultrasonic object detection system according to claim 4, wherein said transmitter includes a pulse generator for determining the rate at which said ultrasonic pulses are transmitted; and wherein said enabling means comprises an integrator circuit having a controllable time constant and receptive of the pulse generator output signal, and a Zener diode connected to the output of the integrator to clip the output signal developed by said integrator.

6. In an ultrasonic detection system according to claim 5, wherein said integrator circuit having a controllable time constant includes an electronic switch for controlling the time constant of said integrator; and wherein said enabling means further includes an astable multivibrator for periodically enabling said electronic switch to periodically vary the integrator time constant.

* * * * *